(12) United States Patent
Elser et al.

(10) Patent No.: US 7,750,516 B2
(45) Date of Patent: Jul. 6, 2010

(54) ELECTRIC MACHINE AND STATOR PROVIDED FOR SAME

(75) Inventors: Armin Elser, Alfdorf-Pfahlbronn (DE); Thomas Berger, Ditzingen (DE); Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 10/584,252

(22) PCT Filed: Dec. 1, 2004

(86) PCT No.: PCT/EP2004/053207

§ 371 (c)(1),
(2), (4) Date: Feb. 19, 2007

(87) PCT Pub. No.: WO2005/064769

PCT Pub. Date: Jul. 14, 2005

(65) Prior Publication Data

US 2007/0278872 A1    Dec. 6, 2007

(30) Foreign Application Priority Data

Dec. 30, 2003 (DE) ................................. 103 61 859

(51) Int. Cl.
*H02K 7/00* (2006.01)
(52) U.S. Cl. ...................... 310/71; 310/68 D
(58) Field of Classification Search ............... 310/68 D, 310/71
See application file for complete search history.

(56) References Cited

U.S. PATENT DOCUMENTS

| 3,582,762 | A | 6/1971 | Kazumasa et al. |
| 3,831,062 | A | 8/1974 | Haug et al. |
| 4,952,829 | A | 8/1990 | Armbruster et al. |
| 6,275,404 | B1 | 8/2001 | Shichijyo et al. |
| 6,538,352 | B2 * | 3/2003 | Asao ........................ 310/68 D |
| 2004/0100808 | A1 | 5/2004 | Braun et al. |

FOREIGN PATENT DOCUMENTS

| DE | 2 228 856 | 1/1974 |
| DE | 2 250 557 | 5/1974 |
| DE | 26 43 612 | 4/1977 |
| DE | 30 09 815 | 9/1981 |

(Continued)

OTHER PUBLICATIONS

"Generators" Edition 98/99, Technische Unterrichtung, Robert Bosch GMBH, 1998 (With English Translation).

*Primary Examiner*—Dang D Le
(74) *Attorney, Agent, or Firm*—Michael J. Striker

(57) ABSTRACT

An electric machine, in particular an alternator for motor vehicles, includes a stator (16), which supports a stator winding (18) that has winding ends (78), a voltage regulator assembly (65), and a rectifier. The electrical connection between the winding ends (78) and the rectifier is situated underneath the voltage regulator assembly (65). A stator for an electric machine, in particular for an alternator for motor vehicles, includes a stator (16), which supports a stator winding (18) that has winding ends (78). The winding ends (78) are connected to an additional conductor element (80), which joins a plurality of individual wires of the winding ends (78) together by means of a clamp-like junction region (81) and is embodied in the form of a sheet metal part.

15 Claims, 6 Drawing Sheets

FOREIGN PATENT DOCUMENTS

| | | |
|---|---|---|
| DE | 33 00 494 | 7/1984 |
| DE | 35 00 723 | 9/1985 |
| DE | 100 07 903 | 10/2000 |
| DE | 101 54 866 | 5/2003 |
| EP | 0 329 722 | 4/1992 |

* cited by examiner

ELECTRIC MACHINE AND STATOR PROVIDED FOR SAME

PRIOR ART

Background of the Invention

The present invention relates to an electric machine and a stator for such an electric machine according to the preambles of the independent claims. For example, the brochure "Generatoren Ausgabe 98/99" [Generators Edition 98/99] from the series "Technische Unterrichtung" [Technical Teaching], published by Robert Bosch GmbH in 1998, has disclosed an electric machine that in this case, is embodied in the form of an alternator for motor vehicles, see page 22. This electric machine has a stator that supports a stator winding whose winding ends are directly connected to a rectifier or a voltage regulator. In addition, there are also known generators sold by the Bosch Company, for example with the type/part number 0120 485 022, which were launched on the market, for example, in 1992. This generator has a stator, which supports a stator winding that has winding ends. At one end surface of the generator, namely the end surface opposite from the drive belt pulley, a rectifier known from the patent literature is situated underneath a protective cap. With regard to this rectifier, European Patent Application EP 0 329 722 B1 is hereby cited by way of example, which discloses more specific details relating to this rectifier. The generator mentioned above is equipped with this specific rectifier, which has an approximately 100°, sector-like empty space on its circumference extending from the radial outside toward the radial inside to a rotor slip ring assembly. This empty space has a voltage regulator assembly inserted into it, which is provided to influence the electrical properties of the stator via an excitation winding in the rotor. The stator and stator winding mounted in this generator have a total six phase winding ends leading from them, which, as described in the above-mentioned European Patent Application, are connected to a circuit card of the rectifier. For considerably more powerful generators, such an arrangement is less advantageous because the guide quivers described in EP 0 329 722 B1 for the stator wires cause an appreciable blockage of cooling air and of the path along which the cooling air flows from the radial outside to the radial inside, past the cooling bodies of the rectifier.

SUMMARY OF THE INVENTION

The electric machine according to the invention has the advantage that moving the electrical connection between the winding ends of the stator winding and the rectifier to a position underneath the voltage regulator assembly enables, for purposes of cooling the rectifier, a larger flow cross-section, permitting a greater volumetric flow through the rectifier. As a result, the rectifier is better cooled, which allows greater demand to be placed on the electric machine as a whole.

If the electrical connection is partially situated between the stator winding and a generator end plate and is in addition, advantageously placed beneath a support, then on the one hand, the stator with the electrical connection can be inserted into the generator end plate with particular ease because there are no obstacles. The placement beneath a support also makes it possible to achieve a vibration-absorbing embodiment.

If the electrical connection between a winding end and an electrical connection of a connecting plate for the rectifier is produced by means of an interposed conductor element, then this permits a simple adaptation of the mechanical properties of the electrical connection to the spatial situation. The form of the interposed conductor element is unlimited at first and can be better adapted with regards to its material properties.

If, in relation to an axial direction of the stator, the electrical connection has a shorter length in the cross sectional direction than in the circumferential direction, then this yields a flat, axial space-saving connection that permits the generator or electric machine to be more compactly embodied.

The stator is connected to the interposed conductor element and can be inserted as a unit into a generator end plate. For example, for the case in which a delta connection of a three-phase winding to the stator is to be provided, there are thus only three connection points instead of the six connection points usually required.

Between the conductor element and the electrical connection of the connecting plate, a junction is provided, preferably a weld. The junction itself—and therefore basically the contact surface between the conductor element and the electrical connection of the connecting plate—should be oriented essentially perpendicular to the axial direction of the stator. This yields a small axial span of the junction and facilitates positioning of the joining tool, for example welding electrodes. There is only a slight risk of contact with adjacent elements, for example a generator end plate or other contacts. In addition, the junctions between the conductor element(s) and the electrical connections of the connecting plate must be situated close to one another since the junction direction does not correspond to the direction in which the junctions are situated close to one another.

Theoretically, it would be possible to leave the electrical connection uninsulated. This would, however, impose particularly strict requirements since the distances between the current-carrying parts here, for example between the generator end plate and the electrical connection, would have to be particularly large. For this reason, an insulating piece at least partially covers the electrical connection. This permits particularly small gap distances and thus particularly compact arrangements in the generator or electric machine. In particular, the insulating piece covers the junction between the conductor element and the winding ends protruding from the stator.

In another embodiment of the invention, an insulating piece connects a plurality of electrical connections to one another. This means that on the one hand, the insulating piece at least partially covers for example three electrical connections, which lead to the electrical connections of the connecting plate, and on the other hand, the insulating piece can hold them in a particular position in relation to one another. This is particularly advantageous when the electrical connections themselves must be placed into contact with the connections of the connecting plate. The secure relative position specifically assures a particularly good positioning of the individual electrical connections in relation to the connections of the connecting plate. In this case, either the insulating piece is first slid onto the unit comprised of the stator and the electrical connection or the insulating piece is attached to the generator end plate, for example by means of a snap connection, before the unit comprised of the stator and electrical connection is mounted in the generator end plate. Furthermore, it has turned out to be advantageous to group, for example, three conductor elements together, thus yielding two groups.

The stator according to the invention, with the defining characteristics of the other independent claim, has the advantage that by connecting the winding ends of the stator winding to an additional conductor element—in which a plurality of individual wires of the winding ends are joined together by means of a clamp-like joining region, which is embodied in the form of a sheet metal part—yields a particularly easy-to-handle unit that generates particularly few problems during production of the electric machine. The plurality of individual wires are respectively joined together by means of this clamp-like joining region and no longer have to be individually joined together mechanically in a complicated manner on the production line. The connection to this additional conductor element also makes it particularly easy to join the winding ends to the connections of the connecting plate so that the invention as recited in the other independent claim achieves on the whole very favorable joining processes on the stator production line and during machine production.

DESCRIPTION OF THE DRAWINGS

Exemplary embodiments of both an electric machine and a stator according to the present invention are shown in the drawings.

DETAILED DESCRIPTION OF THE PREFERRED EMBODIMENTS

Figure 1:
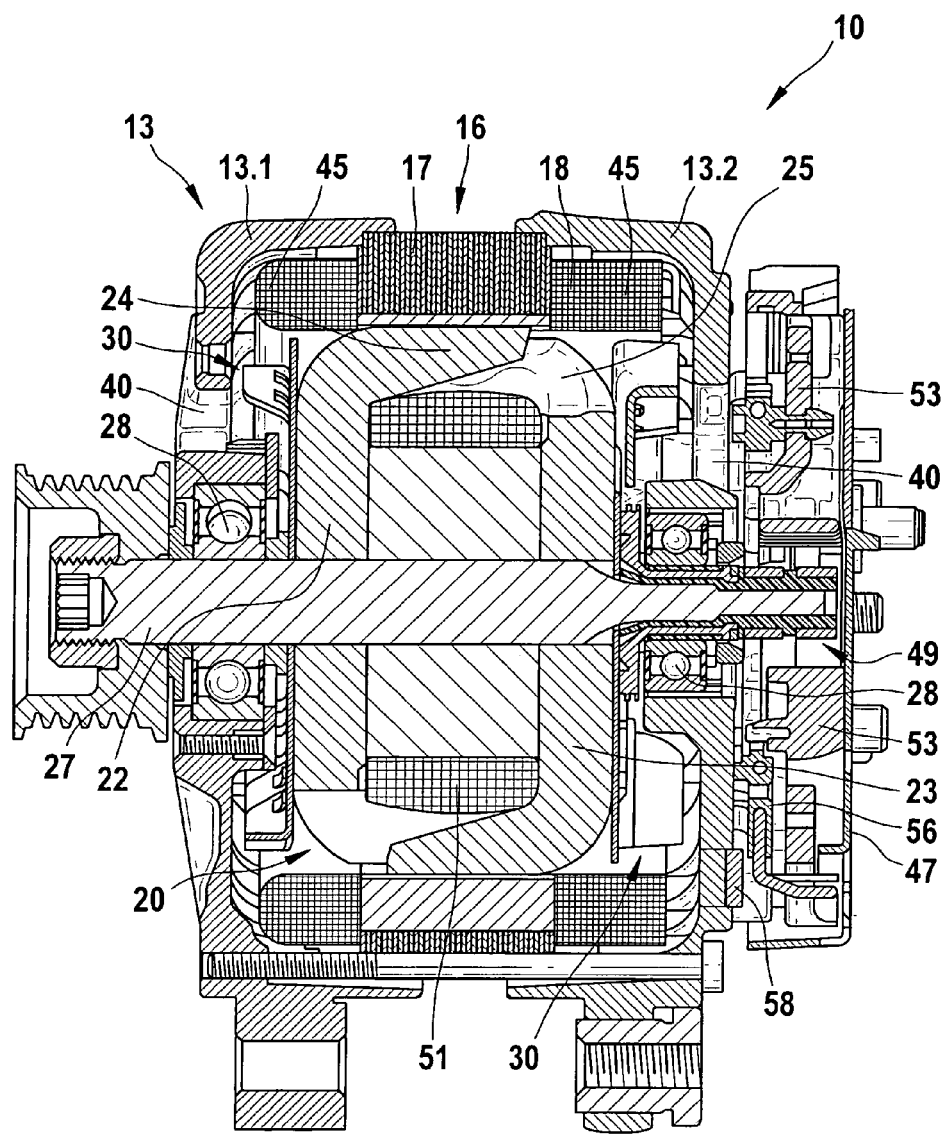
FIG. 1 is a longitudinal section through an electric machine.

FIG. 1 shows a cross section through an electric machine 10, in this case embodied in the form of a generator or alternator for motor vehicles. Among other things, this electric machine 10 has a two-part housing 13 comprised of a first end plate 13.1 and second end plate 13.2. The end plate 13.1 and the end plate 13.2 embrace a so-called stator 16, which is comprised on the one hand of an essentially circular, annular stator iron 17, and a stator winding 18 is inserted into the radially inward-directed, axially extending grooves on the stator iron. This annular stator 16, with its radially inner, grooved surface, encompasses a rotor 20 embodied in the form of a claw-pole rotor. The rotor 20 is comprised, among other things, of two claw-pole plates 22 and 23, whose outer circumferences are respectively provided with axially extending claw-pole fingers 24 and 25. Both claw-pole plates 22 and 23 are situated in the rotor 20 so that their axially extending claw-pole fingers 24 and 25 alternate on the circumference of the rotor 20. This produces magnetically required gaps, referred to as claw-pole gaps, between the claw-pole fingers 24 and 25 that are magnetized in opposite directions. The rotor 20 is mounted in rotary fashion in the respective end plates 13.1 and 13.2 by means of a shaft 27 and roller bearings 28 respectively provided at each end of the rotor.

The rotor 20 as a whole has two axial end surfaces, each of which has a fan 30 attached to it. These fans 30 are each essentially comprised of a plate-shaped or disk-shaped section from which fan blades extend in a known fashion. These fans 30 produce an exchange of air between the outside of the electric machine 10 and the inside of the electric machine 10 via openings 40 in the end plates 13.1 and 13.2. For this purpose, the openings 40 are provided essentially at the axial ends of the end plates 13.1 and 13.2 and permit the fans 30 to draw cooling air into the inside of the electric machine 10. The rotation of the fans 30 accelerates this cooling air radially outward so that it can pass through the cooling air-permeable winding overhang 45. This effect cools the winding overhang 45. After passing through and circulating around the winding overhang 45, the cooling air follows a path radially outward through openings that are not shown in FIG. 1.

On the right side of FIG. 1, there is a protective cap 47, which protects various components from outside influences. For example, this protective cap 47 covers a so-called slip ring assembly 49, which serves to supply excitation current to an excitation winding 51. This slip ring assembly 49 is surrounded by a cooling body 53 that functions here as a plus cooling body. The end plate 13.2 functions as a so-called minus cooling body. Between the end plate 13.2 and the cooling body 53, a connecting plate 56 is provided, which serves to connect minus diodes 58 provided in the end plate 13.2 and plus diodes, not shown in this drawing, in the cooling body 53 to each other, thus producing an intrinsically known bridge circuit.

Figure 2:
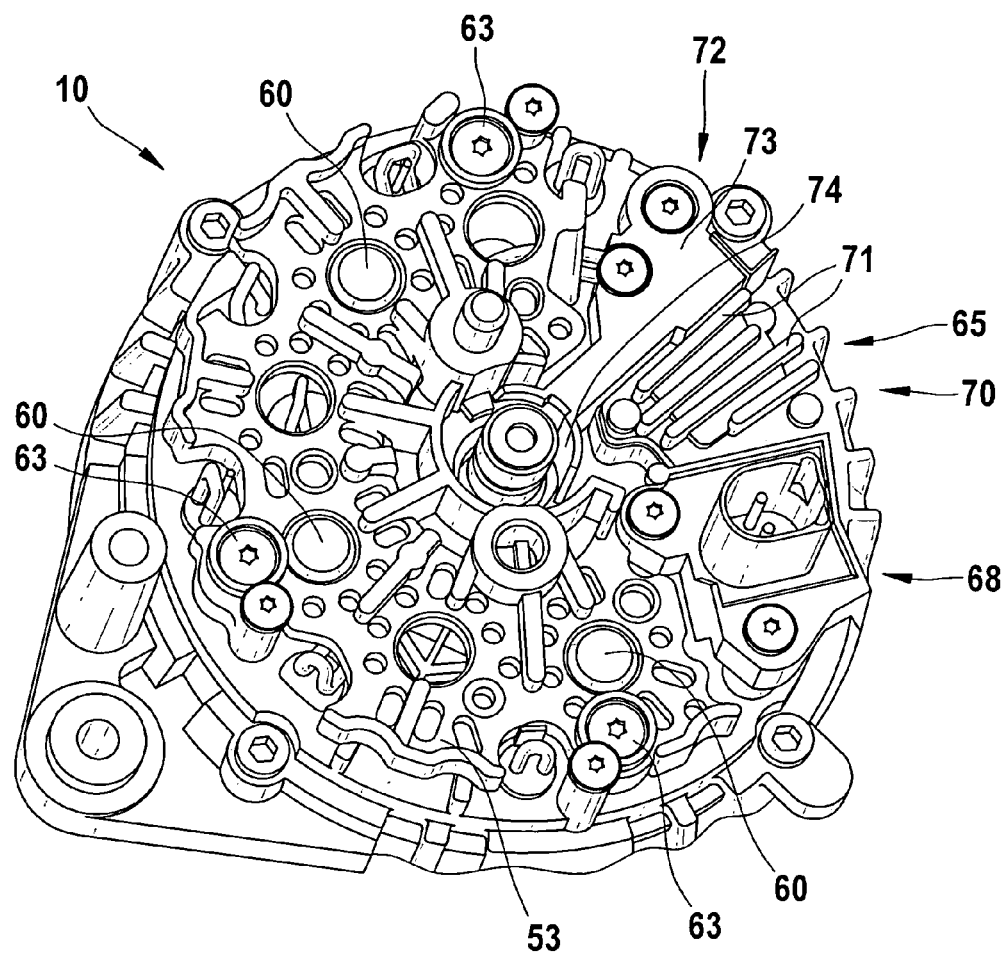
FIG. 2 is a three-dimensional view of an electric machine, which in this case is embodied in the form of a generator, with the protective cap removed.

FIG. 2 is a three-dimensional view of the cooling body 53, with the protective cap 47 removed from the electric machine 10. The plus diodes 60 mentioned above are press-fitted into the cooling body 53. In this example, the cooling body 53 is secured by means of three screws 62. The three screws 62 are attached to the end plate 13.2. The cooling body 53 describes an approximately annular form, with an empty sector of this annular form missing; in other words, the cooling body 53 is comprised not of a closed annular form, but of an open annular form. A voltage regulator assembly 65, which is comprised of various individual function regions, is inserted into this opening of the ring and therefore into the empty sector. The voltage regulator assembly is initially comprised of a connecting region 68 that is adjoined by an electronic region 70. The electronic region 70, whose cooling body 71 can be seen particularly well here and serves to cool the electronics situated underneath it, is followed by a brush region 72 that is essentially comprised of a tubular brush holder 73 and brushes 74 contained therein. This voltage regulator assembly 68 is provided to influence the electrical properties of the stator 16 and stator winding 18.

Figure 3:
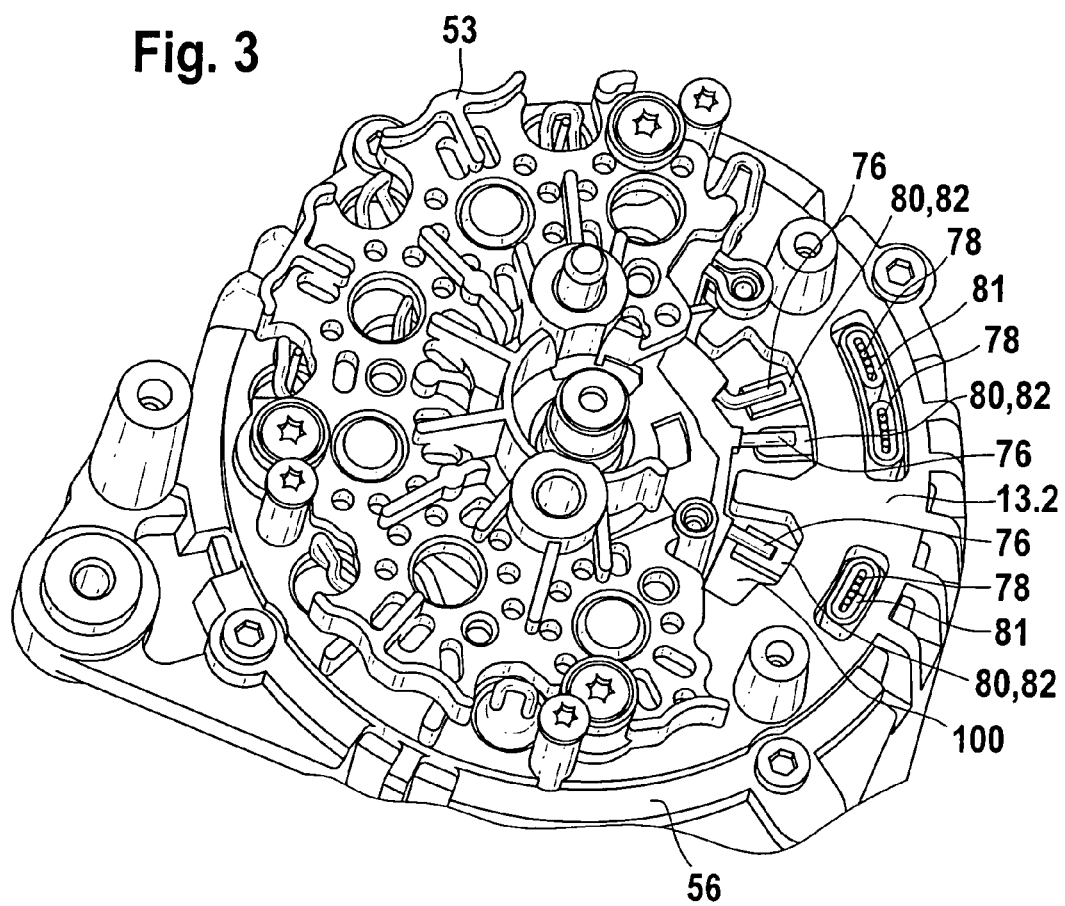
FIG. 3 shows a view similar to the one in FIG. 2, but without the voltage controller.

FIG. 3 shows the embodiment from FIG. 2, with the voltage regulator assembly 65 removed. The connecting plate 56 situated under the cooling body 53 has a total of three electrical connections 76 that protrude in the form of solid rods out from an insulation material of the connecting plate 56. These connections 76 are each connected in a conductive fashion to a winding end 78. These winding ends 78 do not actually have to be the individual connections of a single phase winding; this term can also be used describe conjoined connections or winding ends of a plurality of phase windings. This applies, for example, to the present instance in which the three connections 76 each respectively contact their own winding end 78. The winding ends 78 in this exemplary embodiment each include two ends of two different phase windings so that the winding ends 78 provided here permit the production of a so-called delta connection of the phase windings. In this case, the electrical connection between the winding ends 78 and the rectifier is situated underneath the voltage regulator assembly 65.

On the whole, this provides an electric machine 10, in particular an alternator for motor vehicles, which has a stator 16 supporting a stator winding 18; this stator winding 18 or its phase windings has/have winding ends 78. The connecting plate 56 is a component of the rectifier and serves to connect the minus diodes 58 and plus diodes 60 to form a bridge circuit. In addition, a voltage regulator assembly 65 and a rectifier are provided; the electrical connection between the winding ends 78 and the rectifier is situated underneath the voltage regulator assembly 65.

In the exemplary embodiment shown in FIG. 3, the electrical connection between a winding end 78 and an electrical connection 76 of a connecting plate 56 is provided by means of an interposed conductor element 80. This conductor element 80 is essentially comprised of two regions: on the one hand, it is comprised of a clamp-like junction region 81 and on the other hand, it is comprised of a strip conductor segment 82 integrally joined to this clamp-like junction region 81 and extending from this junction region 81 to the connection 76. The strip conductor segment 82 is provided to be connected at its end oriented away from the junction region 81 to the connections 76. For this purpose, the connections 76 are placed, oriented in the axial direction of the stator 16 (rotor rotation axis direction), onto the strip conductor segment 82 and attached to the strip conductor segment 82 there. The junction produced when the conductor element 80 and the electrical connection 76 of the connecting plate 56 are joined, for example a weld or solder point, is oriented essentially perpendicular to the axial direction of the stator 16. The junction thus protrudes axially into an opening 100.

Figure 4:
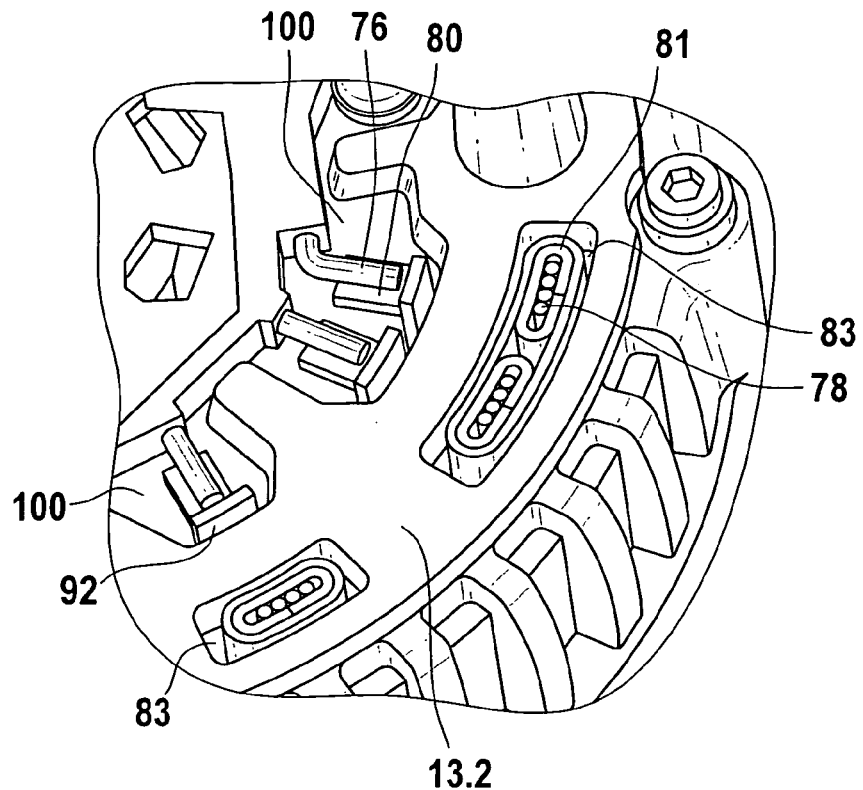
FIG. 4 shows a detail relating to the connection between the winding ends, the conductor element, and the connecting plate.

FIG. 4 shows an enlarged detail of the region between the connections 76 and the winding ends 78. The clamp-like junction region 81 protrudes through an opening 83, which is let into the end surface of the end plate 13.2. As shown in FIG. 4, two clamp-like junction regions 81 are permitted to pass through an opening 81 and in addition, a third clamp-like junction region 81 is permitted to pass through an additional opening 83. Further details relating to the conductor element 80 will be discussed at a later point.

Figure 5A:
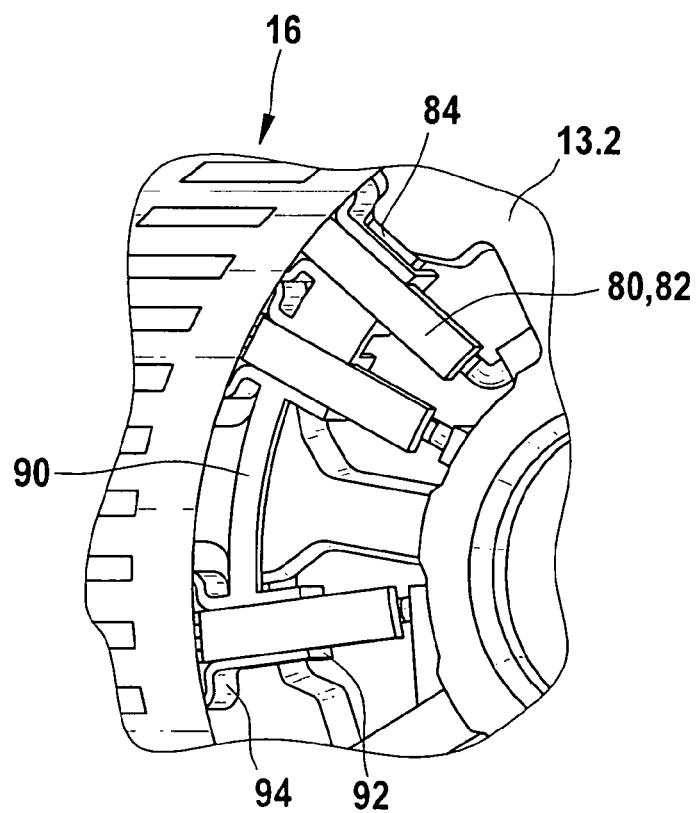
FIG. 5a shows the conductor element from FIG. 4, but from inside the generator end plate shown in FIG. 4.

FIG. 5a shows the conductor element 80 from the inside of the end plate 13.2. This conductor element 80—as mentioned above—produces the electrical connection between the stator winding 18 and the connecting plate 56. As shown in FIG. 5a, this electrical connection is partially situated between the stator winding 18 and the end plate 13.2. Preferably, the electrical connection and/or the conductor element 80 is positioned underneath a support 84 that serves to connect larger surface regions of the end plate 13.2 to one another.

Figure 5B:
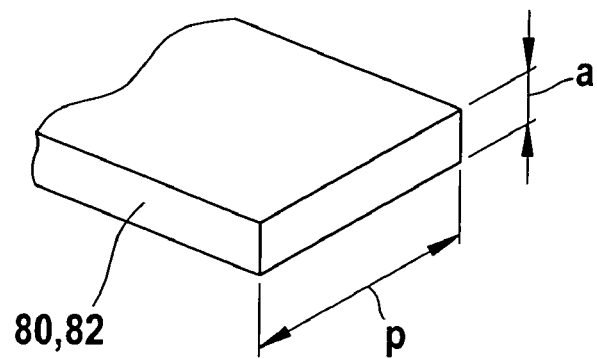
FIG. 5b shows a detail of the conductor element.

FIG. 5b shows an end surface of a strip conductor segment 82. This end surface—as is clear from FIG. 5a—is oriented toward the connecting plate 56. The end surface, rectangular in this instance, is embodied as relatively narrow. The end surface has a thickness a in the axial direction of the stator and a width p in the circumferential direction of the stator. With regard to an axial direction of the stator, the electrical connection has a shorter length a in the cross sectional direction than in the circumferential direction. The conductor element 80 is thus flat and at least sheet-like.

Figure 6:
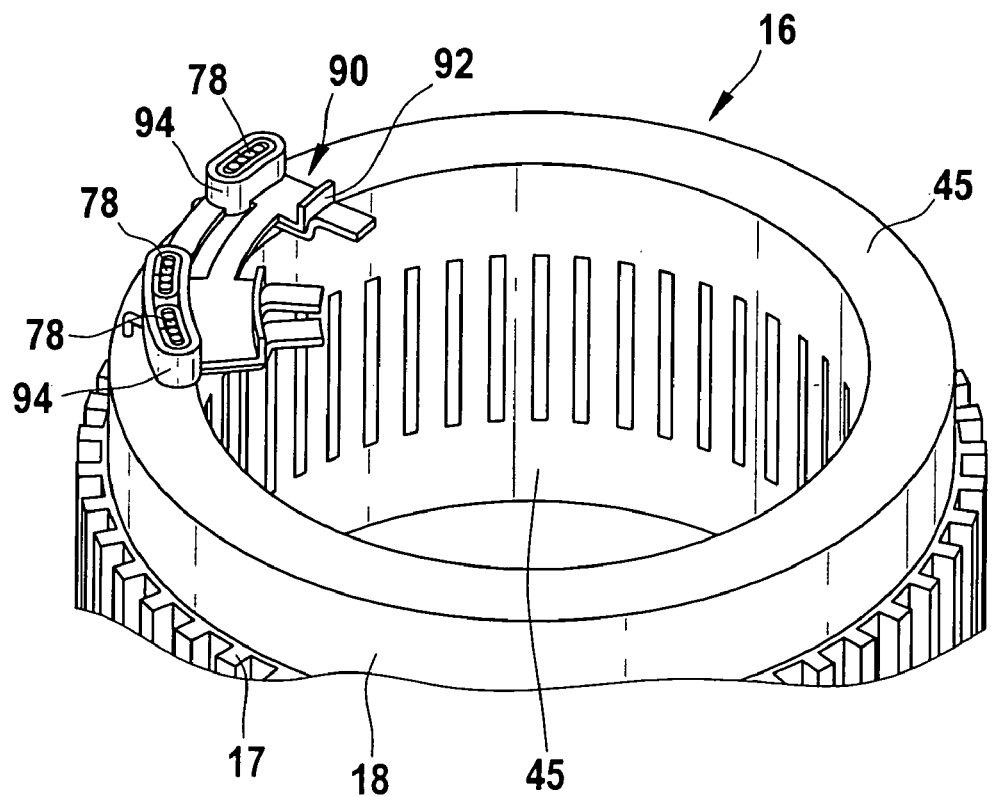
FIG. 6 is a three-dimensional view of a stator with the winding and the conjoined conductor elements.

FIG. 6 shows a detailed, three-dimensional view of the stator 16 with the stator iron 17 and the stator winding 18, both of whose winding heads 45 are visible. The stator winding 18 here is shown in a very schematic fashion and is naturally comprised of wound or inserted wires or of laminated conductors. This wound or inserted winding head or the stator winding 18 has winding ends 78 extending from it, which are grasped by the clamp-like junction regions 81. The winding ends 78 protruding from the winding head are embodied in a particular form, which does not subject the winding ends 78 to excessive stress during the joining process and which is not shown here. The winding ends 78 do not pass between the stator iron 17 and the clamp-like joining region 81 in the axial direction, but obliquely to it. This yields two bends, namely a first bend out of the axial direction into direction oblique to it and then a second bend back out of the oblique direction into the axial direction. This double bend achieves a reduction in force since no axial forces from the clamp-like junction region 81 directly press the winding ends 78 into the grooves of the stator iron. The parts shown in FIG. 6 basically represent an assembly that is produced during the course of the stator production or production of the electric machine 10. As a result, in the case of a three-phase winding, the stator 16 is attached to three interposed conductor elements 80. This unit can be inserted in this state into an end plate 13.2 or 13.1. If the delta connection is to be produced in the connecting plate 56 first, then two winding ends 78 per phase winding protrude from this stator 16, permitting a total of six conductor elements 80 to be mounted. In a star connection, a star point is also provided somewhere on the stator 16. As is already clear in the other figures, an insulating piece 90 partially covers the electrical connection and in this instance, for example, the conductor element 80. This insulating piece 90 is in particular provided where the conductor element 80 crosses the support 84, also see FIG. 5a. This insulating piece provides a sufficient protection against a short circuit between a conductor element 80 and the end plate 13.2. The insulating piece 90 can be embodied in such a way that it not only covers the conductor element 80 and thus the strip conductor section 82, but also encompasses the clamp-like junction region 81, thus insulating the region at the same electrical potential from the end plate 13.2 in the opening 83. The insulating piece 90 covers the junction between the winding ends 78 and the conductor element 80.

The part of the insulating piece 90 covering the strip conductor section 82 has a basically U-shaped profile in the direction of the strip conductor section 82, producing a shelf on one side of the strip conductor section 82, thus providing further insulation from adjoining regions of the end plate 13.1. It is possible for this insulating piece 90 to be integrally joined, for example, to an additional extending flange 92 that insulates the strip conductor segment 82, which protrudes underneath the support 84, from the support 84 itself. Toward the radial outside, the insulating piece 90 preferably has a kind of collar 94 extending from it, which encircles the clamp-like junction region 81. The collar 94 is thus situated in sleeve fashion around the junction or clamp-like junction region 91. As shown in FIG. 6, the insulating piece 90 connects a plurality of electrical connections to one another. This insulating piece 90 thus functions practically as a spacer between the strip conductor segments 82, consequently fixing the angular spacings between the individual strip conductor segments 82. Incidentally, the insulating piece does not absolutely have to be placed on the conductor element 80. This placement is primarily understood to mean a type of clipping or attachment of the insulating piece 90 to the conductor element 80. The insulating piece 90 can just as easily also be clipped or otherwise fastened to the support 84 or other adjoining housing parts of the end plate 13.2.

Whereas up to now, the insulating piece 90 has always been attached to a separate conductor element 90, an insulating piece 90 of this kind can naturally also serve to attach any kind of electrical connections to one another or can be attached to an individual electrical connection. This would be permitted, for example, not by having the individual winding ends 78 simply end shortly after a winding head 45, as shown by way of example in FIG. 6, but by having them be routed, for example, radially inward until the winding ends 78, as an electrical connection, reach a connection 76 of the connecting plate 56. In this case as well, these electrical connections could be protected by an insulating piece and could also be connected to one another by means of the insulating piece 90. As has already been mentioned, a total of three conductor elements and/or electrical connections are provided, which are divided up into two groups. In this case, providing two groups means that two electrical connections or conductor elements are situated in closer proximity to each other than a third conductor element or third electrical connection.

Figure 7:
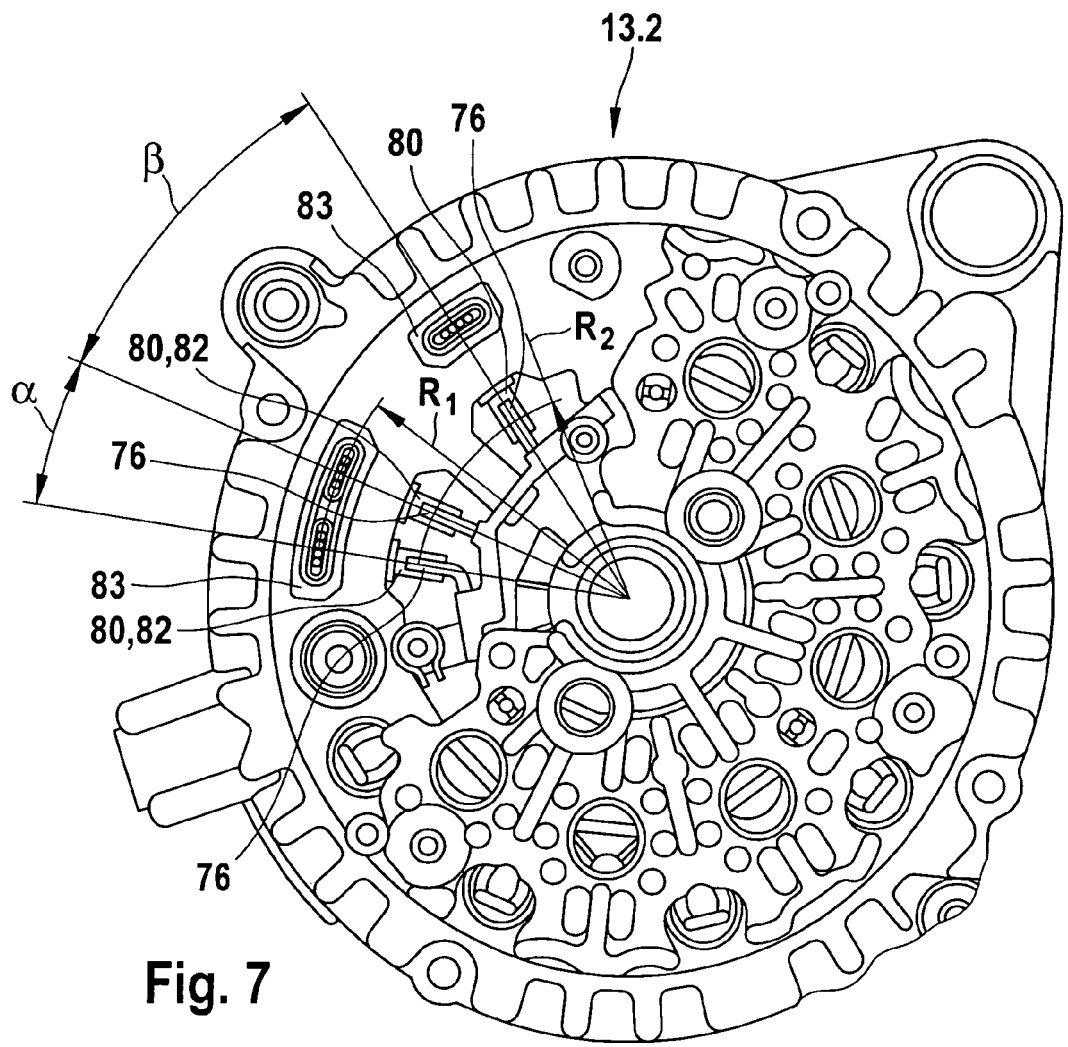
FIG. 7 is a detailed end view of the so-called brush-end generator end plate.

FIG. 7 shows a detailed end view of the so-called brush-side end plate 13.2, without the voltage regulator assembly 65. In this context, it has turned out that an optimum for the rigidity of the end plate 13.2 and simultaneously also for the cooling air flow between the end plate 13.2 and the voltage regulator assembly 65 to the rectifier is achieved if the angular spacing between the conductor elements 80 of the closely placed conductor elements 80 lies between 5° and 20°. Incidentally, a value of approximately 13.5° is preferable here. This angle is labeled Δ in FIG. 7. The single, separate conductor element 80 should have an angular spacing of between 25° and 35° in relation to the above-mentioned double group. Ideally, this angle E is close to 30°. The ratio of E and Δ to each other should be between 1.5 and 3, particularly preferably between 2 and 2.5, with an ideal value being approximately 2.2. These angular values relate to the position of the clamp-like junction regions 81 in relation to one another and also to the position of the end sections of the strip conductor section 82, which end sections are provided for being joined to the connections 76. From a strength standpoint, the radial spacing of the openings 83 and the closed clamp-like junction regions 81 ideally lies between 50 mm and 62 mm. This radius range or radius is labeled $R_1$ here. The radial width of an opening 83 here is approximately 8 mm. With optimum air flow and the best cooling for the connection point, the radial position of the junction between the strip conductor segment 82 and the connection 76 to the connecting plate 56 should lie in a radius range between 30 mm and 40 mm; this radius range or radius is labeled $R_2$ here. The actual desired value for $R_2$ is approximately 36 mm. $R_2$ and $R_1$ each refer to the geometrical center point of the connection points. As an optimum equilibrium among cooling air flow, cooling of the connection point, and strength of the end plate, the ratio of $R_2$ to $R_1$ lies between 1.3 and 1.7, with a preferred value being 1.5.

As has already been described in relation to FIG. 6, the figure shows a stator 16 for an electric machine, which has a stator winding 18 and the winding ends 78. These winding ends 78 are connected to an additional conductor element 80; a plurality of individual wires of the winding ends 78 are joined together by means of a clamp-like junction region 81, which is embodied in the form of a conventional crimp. The conductor element 80 is embodied in the form of a sheet-metal part. The conductor element 80 extends essentially radially inward in order to contact the connections 76.

The insulating piece 90 does not protrude or only protrudes slightly from the end plate 13.2 in order not to block the flow path beneath the voltage regulator assembly 65.

What is claimed is:

1. An electric machine, in particular an alternator for motor vehicles, comprising:
   a rotor (20) with a shaft (27);
   a stator (16), which supports a stator winding (18) that has winding ends (78);
   a voltage regulator assembly (65); and
   a rectifier, wherein an electrical connection connects the winding ends (78) and the rectifier with one another, and wherein the electrical connection is disposed in a rotor rotation axis direction underneath the voltage regulator assembly (65).

2. The electric machine as recited in claim 1,
   wherein the electrical connection is partially situated between the stator winding (18) and an end plate (13.2) and preferably, underneath a support (84).

3. The electric machine as recited in claim 1,
   wherein the electrical connection between a winding end (78) and an electrical connection (76) of a connecting plate (56) is achieved by means of an interposed conductor element (80).

4. The electric machine as recited in claim 1,
   wherein the electrical connection has a cross section with a first length (a) extending in an axial direction of the stator and a second length (p) extending in a circumferential direction of the stator, wherein the first length (a) is shorter than the second length (b).

5. The electric machine as recited in claim 4,
   wherein the stator (16) is connected to the interposed conductor element (80) and is able to be inserted as a unit into an end plate (13.2).

6. The electric machine as recited in claim 5,
   wherein a junction, preferably a weld, between the conductor element (80) and the electrical connection (76) of the connecting plate (56) is oriented essentially perpendicular to the axial direction of the stator (16).

7. The electric machine as recited in claim 1,
   wherein an insulating piece (90) partially covers the electrical connection.

8. The electric machine as recited in claim 7,
   wherein the insulating piece (90) covers a junction between the winding ends (78) and the conductor element (80).

9. The electric machine as recited in claim 7,
   wherein the insulating piece (90) attaches a plurality of electrical connections to one another.

10. The electric machine as recited in claim 7,
    wherein three electrical connections in the form of conductor elements (80), are provided, which are divided up into two groups, wherein a first group includes two electrical connections and a second group includes one electric connection, wherein the two electrical connections of the first group are situated in closer proximity to one another than to the electrical connection of the second group.

11. A stator for an electric machine, in particular for an alternator for motor vehicles, comprising:
    a stator (16), which supports a stator winding (18) that has winding ends (78);
    a stator iron (17);
    wherein the winding ends (78) are connected to an additional conductor element (80), which joins a plurality of individual wires of the winding ends (78) together by means of a clamp-like junction region (81) and is embodied in the form of a sheet metal part, and wherein the winding ends (78) do not pass between the stator iron (17) and the clamp-like junction region (81) in an axial direction, but pass obliquely between the stator iron (17) and the clamp-like junction region (81).

12. The stator as recited in claim 11, wherein the conductor element (80) extends essentially radially inward.

13. The stator as recited in claim 11,
    wherein the insulating piece (90) partially covers the conductor element (80).

14. The stator as recited in claim 11,
    wherein the insulating piece (90) partially covers a junction between the winding ends (78) and the conductor element (80).

15. The stator as recited in claim 11,
    wherein an insulating piece (90) joins a plurality of conductor elements (80) together and determines a relative position among the conductor elements (80).

* * * * *